United States Patent [19]

Larsen

[11] Patent Number: 5,121,048
[45] Date of Patent: Jun. 9, 1992

[54] FEEDBACK CONTROL SYSTEM FOR STATIC VOLT AMPERE REACTIVE COMPENSATOR WITH THYRISTOR CONTROLLED REACTANCES

[75] Inventor: Einar V. Larsen, Charlton, N.Y.

[73] Assignee: Electric Power Research Institute, Palo Alto, Calif.

[21] Appl. No.: 605,792

[22] Filed: Oct. 29, 1990

[51] Int. Cl.⁵ .............................................. G05F 1/70
[52] U.S. Cl. ................................. 323/210; 323/910
[58] Field of Search ............... 323/208, 209, 210, 211, 323/910

[56] References Cited

U.S. PATENT DOCUMENTS 4,680,531  7/1987  Rey et al. ............................ 323/210
4,698,581 10/1987  Shimamura et al. ................. 323/210
4,752,726  6/1988  Aoyama .............................. 323/210

Primary Examiner—Peter S. Wong
Attorney, Agent, or Firm—Flehr, Hohbach, Test, Albritton & Herbert

[57] ABSTRACT

An improved control system for static volt ampere reactance compensator provides for a transformation of the three phases into a two-variable system which thus isolates any common mode in the associated delta. Improved control is provided by utilizing the flux change as an advance indication of a disturbance. Lastly, the two-variable system, as it is inverse transformed into a three variable system, has its phasors rotated to prevent oscillation.

6 Claims, 5 Drawing Sheets

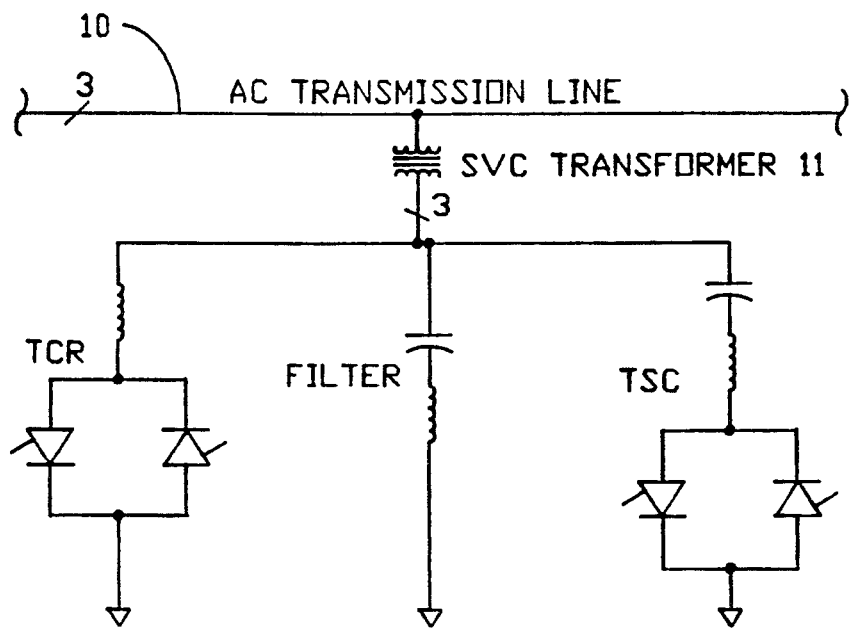
FIG.—1A
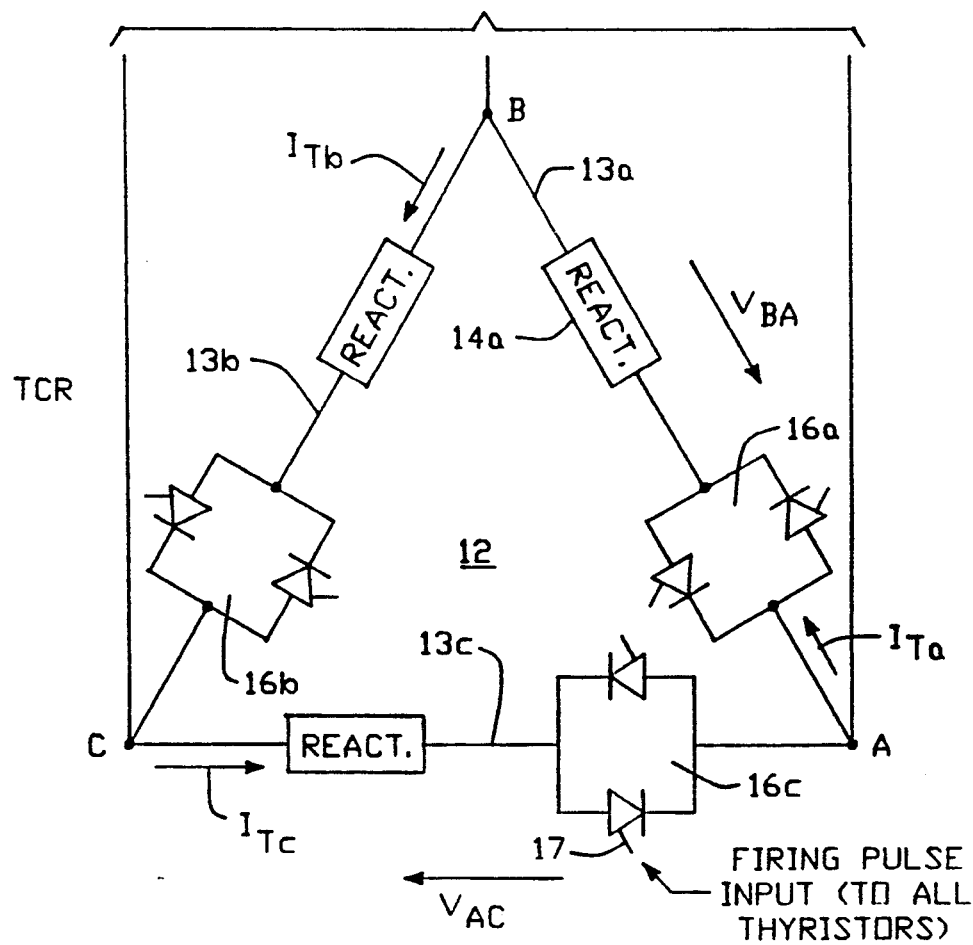
FIG.—1B

FIG.—5A  $T1 = \begin{bmatrix} 1 & 0 & -1 \\ -1 & 1 & 0 \\ 1 & 1 & 1 \end{bmatrix}$  $\Theta = a - c$
$\lambda = a - b$
$0 = a + b + c$
FIG.—5B  $[T1]^{-1} = 1\backslash 3 \begin{bmatrix} 1 & -1 & 1 \\ 1 & 2 & 1 \\ -2 & -1 & 1 \end{bmatrix}$
FIG.—5C  $[T2] = \begin{bmatrix} 1 & -1 \\ 1 & 2 \\ -2 & -1 \end{bmatrix} \begin{bmatrix} COSX & SINX \\ -SINX & COSX \end{bmatrix}$
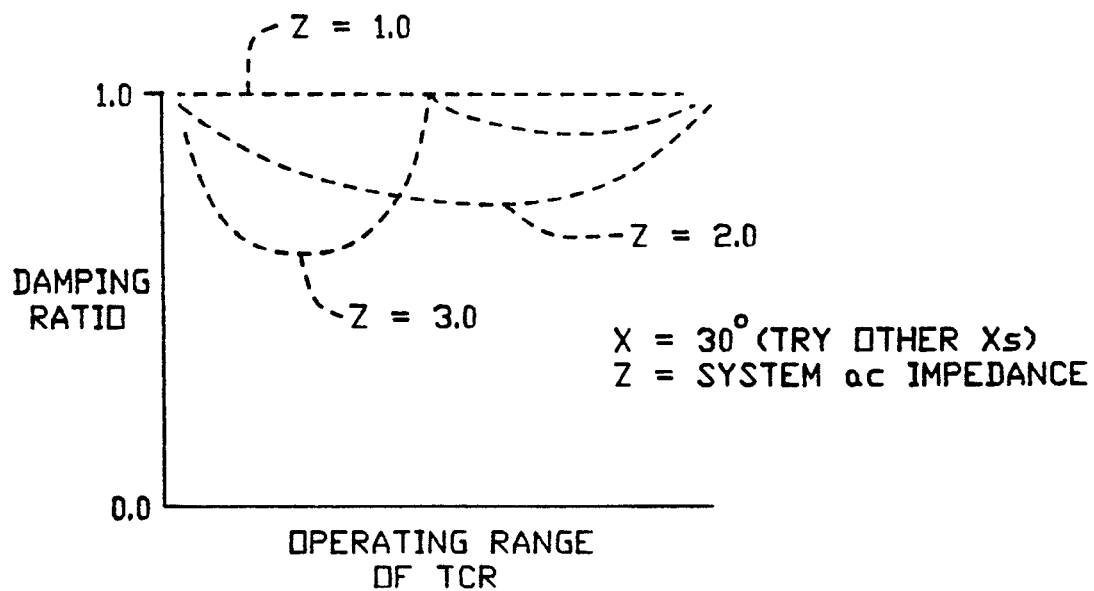
FIG.—6

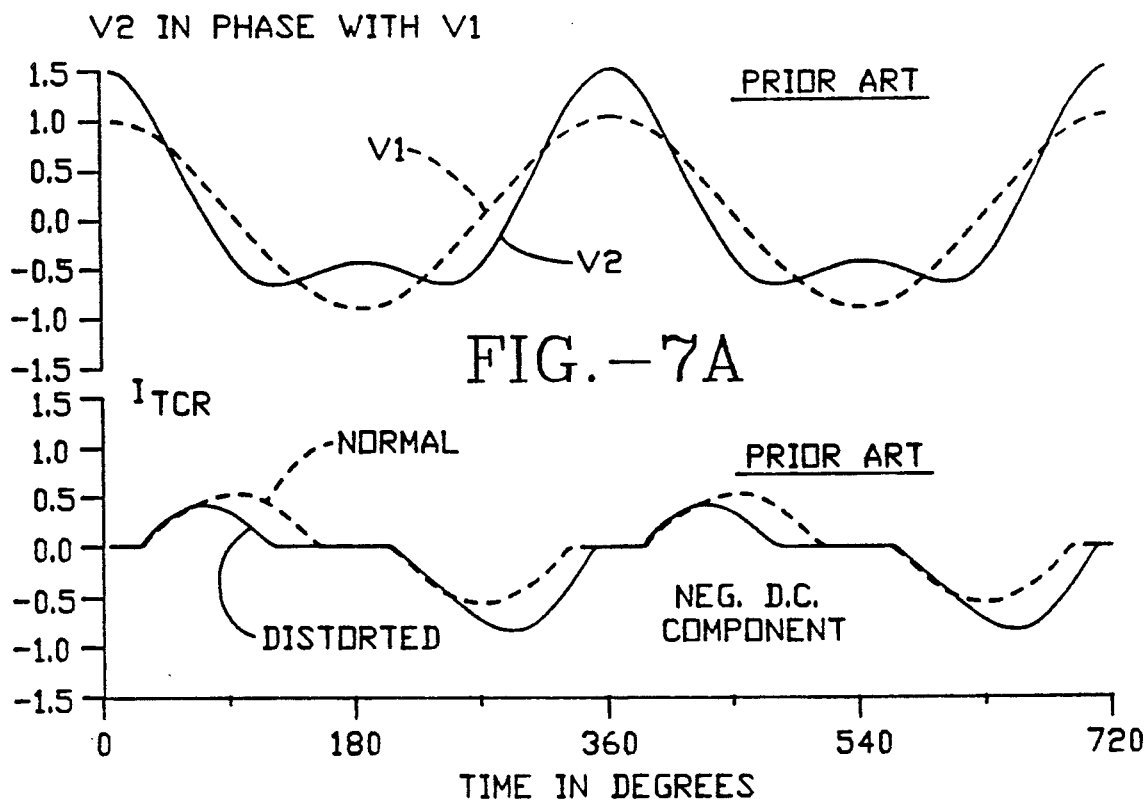
FIG.–7A
FIG.–7B
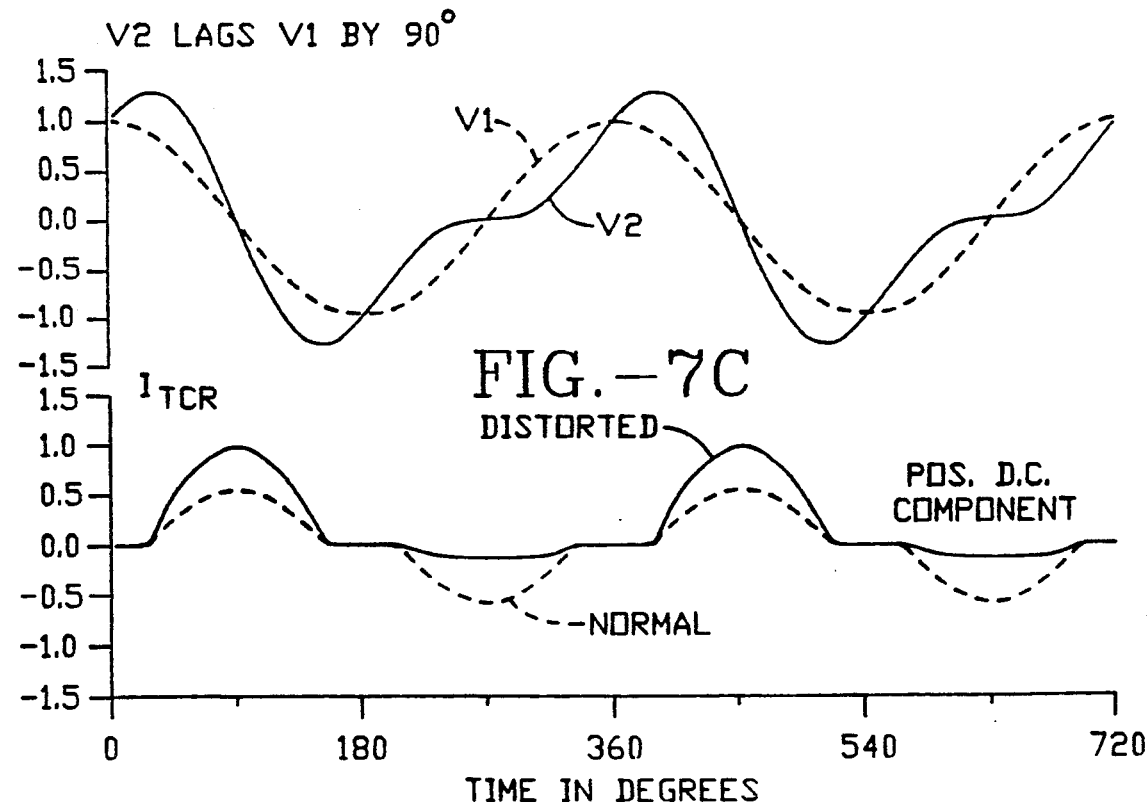
FIG.–7C
FIG.–7C

FEEDBACK CONTROL SYSTEM FOR STATIC VOLT AMPERE REACTIVE COMPENSATOR WITH THYRISTOR CONTROLLED REACTANCES

The present application is directed to an improved feedback control system for static volt ampere compensators with thyristor controlled reactances.

BACKGROUND OF THE INVENTION

Static VAR (volt-ampere reactive) compensators (SVCs) are used to control voltage on AC transmission systems. Most SVCs include as one of the key controlling elements a thyristor-controlled reactor (TCR), as illustrated in FIG. 1A as a one-line diagram. The TCR consists of an anti-parallel pair of thyristor valves in series with an inductor. By delaying the firing of these thyristor valves beyond the natural conduction time of the inductive branch, a vernier control of the effective inductance applied to the AC power circuit is obtained. This is well established art.

Some applications of SVCs have shown a tendency towards interaction between the TCR currents and a second harmonic voltage distortion on the AC system. In many cases, the natural reaction of the TCR tends to reinforce the second harmonic voltage distortion. This effect has been traced to the natural tendency of the TCR to produce a DC component of current when a second harmonic voltage distortion is present. FIGS. 7A-7D illustrate this tendency. The DC component in turn affects the offset saturation experienced by the SVC transformer, as well as other transformers which may be in the vicinity. Since offset saturation in transformers is known to produce a second harmonic component of magnetizing current, a feedback loop is created, which involves both a DC and second harmonic component of current in the TCR.

This phenomenon was recognized by the power industry several years ago, and certain corrective measures have been installed. One such corrective measure is a large second harmonic power filter. Another is a special control function in the TCR which acts to null the measured DC component of current in the TCR. An example of this so-called "TCR current balancing control" is shown in FIG. 2. This control comprises an average detector 18 which measures the DC component of TCR current, an integrating regulator 19, which acts to null the measured DC component of TCR current, and a polarity switch 21 to properly account for operation in the two polarities of the AC voltage waveform. This signal is then added to the other regulator commands of the other phases "a, b and c" to obtain a total firing control signal for the TCR valves.

In prior art applications, this balancing control is applied to all three phases of the TCR. The three phases then operate on their own measured current and affect only their own firing control, with no significant information passed between phases Since nearly all TCRs are delta-connected, as shown in FIG. 1B, there exist only two independent currents flowing into the AC transmission system. The third phase is simply the sum of the other two. Thus, the prior art creates a control system with three regulating state but only two independent paths of interacting with the AC transmission system.

An additional problem with the prior art is a tendency of the balancing control to oscillate as it converges. Yet another problem is poor transient response following a major disturbance on the AC transmission system.

OBJECTS AND SUMMARY OF INVENTION

Thus, it is the general object of the present invention to provide an improved control system for the above.

In accordance with the above object, there is provided in a static volt-ampere reactive (VAR) compensator (SVC) where thyristor controlled reactances (TCR) are utilized in a normally delta electrical configuration, and where a feedback control system controls the firing angles of the thyristor switches to balance the TCR current, the improvement in the control system comprising means for isolating a common mode in the delta from the three input variables of current in each branch of the delta by transforming the three variables to a two-current variable system.

BRIEF DESCRIPTION OF DRAWINGS

FIG. 1A is a circuit schematic showing a static VAR compensator utilizing the present invention.

FIG. 1B is a detailed circuit of the thyristor controlled reactance of FIG. 1A.

FIGS. 5A, 5B and 5C show matrix functions used in the present invention.

FIG. 6 is a characteristic curve used in the present invention.

FIGS. 7A-7D are waveforms illustrating the natural reaction of a TCR circuit to second harmonic voltage distortion.

DETAILED DESCRIPTION OF PREFERRED EMBODIMENT

Figure 2:
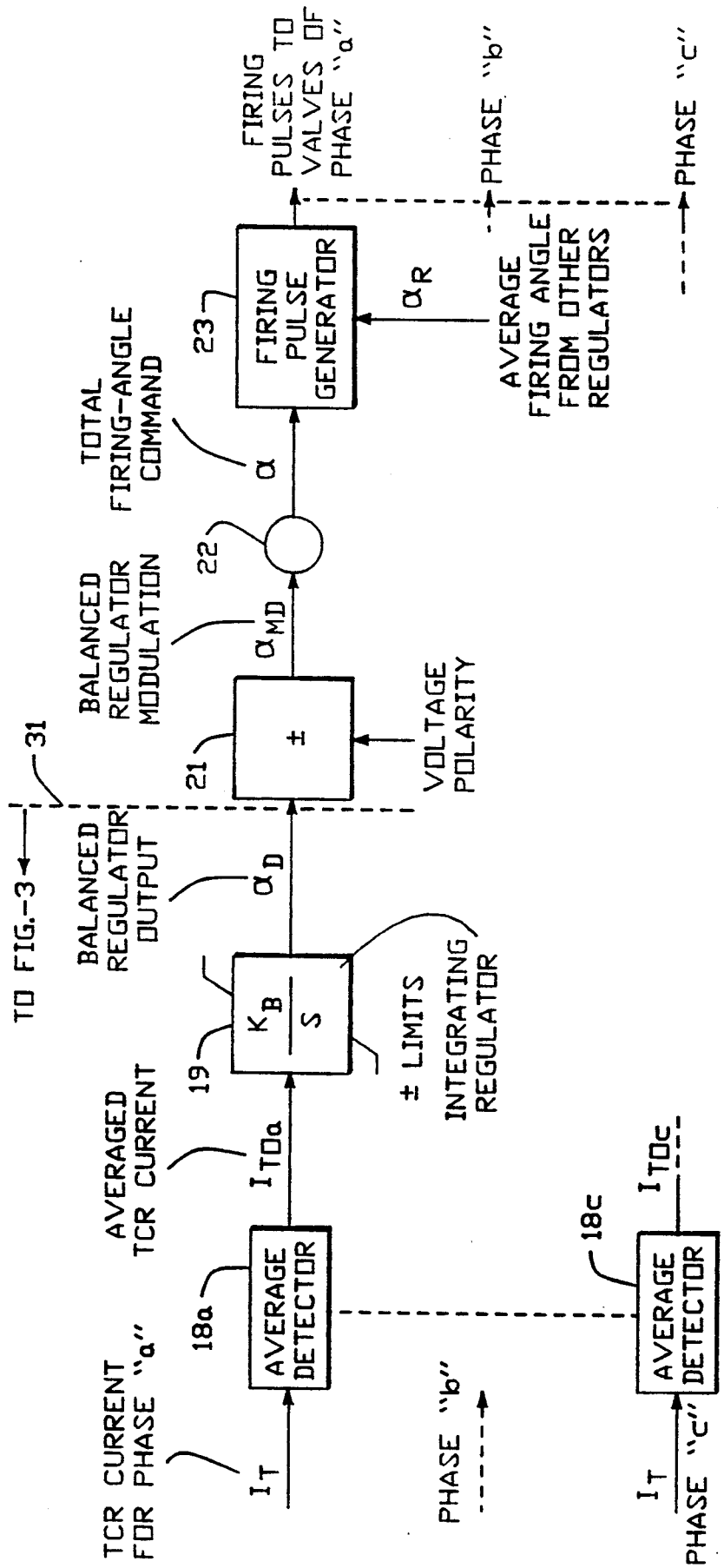
FIG. 2 is a block diagram illustrating a control system of the prior art.

FIG. 1A illustrates the overall system in which the present invention operates. Basically, a three-phase transmission line 10 having the phases A, B, C has connected to it via the transformer 11 a static volt ampere reactive compensator (SVC). This compensator is for the purpose of regulating the voltage on the transmission line to provide for transmission line stability and load flow regulating purposes. The SVC normally includes a TCR (thyristor controlled reactance) circuit, a filter branch and a thyristor switched capacitor (TSC) branch.

The TCR is usually always connected in a delta electrical configuration illustrated at 12 in FIG. 1B and designated a thyristor controlled reactance (TCR). Each leg of the delta 12, namely, 13a, 13b, and 13c includes a reactance 14a, 14b, 14c, and back-to-back connected thyristor switches 16a, b, c. All of these thyristor switches include a control input such as indicated at 17, which receives a firing pulse to control the firing angle of that particular leg. And as indicated on the drawing of FIG. 1B, each leg carries a particular current designated $I_{Ta}$, etc. In addition, the voltages across them are similarly designated to reflect the phases across which that leg of the delta is connected, such as $V_{BA}$, etc.

A problem in the foregoing technique is that the SVC is susceptible to a second harmonic distortion. This may arise from internal faults in the transmission system or externally induced geomagnetic currents. All of the foregoing causes a DC component in the TCR 12 due to the saturation of the transformer 11. In the past, to correct this DC offset current, a balancing feedback control system has been provided, as illustrated in FIG. 2.

Referring to FIG. 2 in detail, such balancing control consists of three individual feedback control loops, one for each phase. Referring to phase "a," the current $I_T$ for that phase is averaged in average detector 18a to provide an averaged offset DC current, $I_{To}$. Integrating regulator 19 then provides an output $a_D$, which provides a firing angle command. This angle output is processed through a voltage polarity unit 21, is summed with an average firing angle from other regulators at 22, and then the final firing angle command is processed through the firing pulse generator 23 to serve as a firing pulse to the thyristor switches (valves) of that phase "a." And the same is true of the other phases.

As discussed previously, this system suffers from three problems:
1. Susceptibility to instability involving the common mode;
2. Oscillatory behavior;
3. Slow response to major disturbances.

Figure 3:
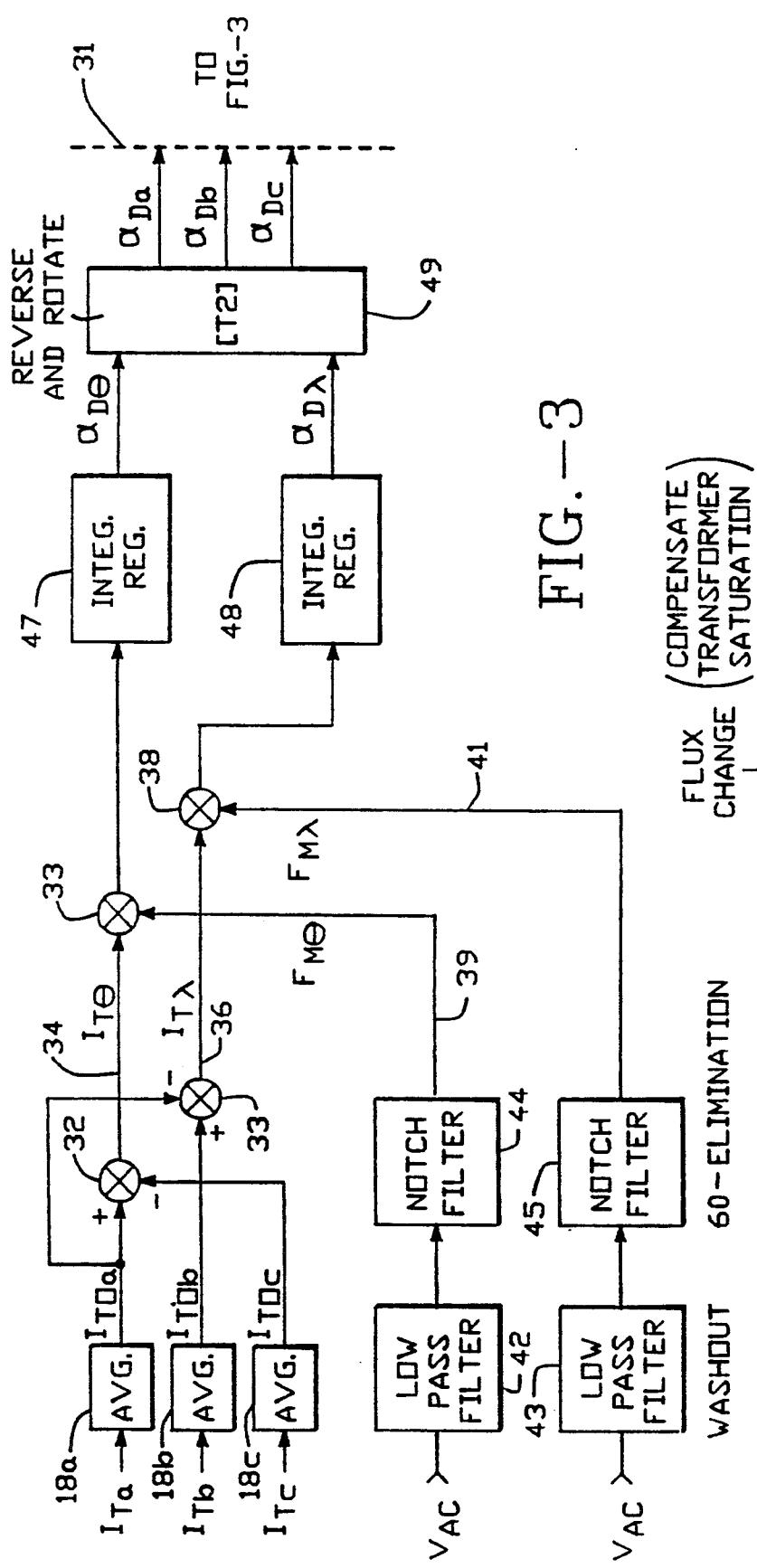
FIG. 3 is a block diagram embodying the present invention.

Referring now to FIG. 3, the improved control system of the present invention in effect substitutes for all of the functional blocks as shown in FIG. 2, to the left of the dashed line 31 and then after deriving three suitable firing angles, $a_D$, utilizes the standard components to the right of the dashed line 31, as illustrated in FIG. 2, to provide the final firing pulses to the thyristors or valves of each of the phases of the delta illustrated in FIG. 1.

Referring specifically now to FIG. 3, the three currents, $I_{Ta}$, $I_{Tb}$ and $I_{Tc}$, are as in the case of the prior art averaged in average detectors 18a, 18b, 18c, to provide the averaged DC offset current in each phase $I_{TOa}$, $I_{TOb}$, $I_{TOc}$. Recent research with regard to the present invention has shown that the presence of the third regulating state of the prior art control technique of FIG. 2, as discussed above, can cause an instability with the TCR balance controls. This instability occurs with the so-called "zero sequence" or "common mode" component of TCR current. This is the component which can be viewed as circulating within the delta connection of the TCR. To eliminate the common mode pairs of the delta branch currents are differenced in the units 32 and 33 to provide a two-current variable system on the lines 34 and 36 designated $I_T\Theta$ and $I_{T\lambda}$.

Next, in order to provide an advanced indication of the disturbance before it fully develops, the theta-/lambda branches 34 and 36 are differenced in units 37 and 38 with similar theta/lambda domain signals designated $FM\Theta$ and $FM\lambda$ on lines 39 and 41 which measure a change of flux directly, rather than waiting for the consequence of that change of flux. And such consequence is the transformer magnetizing currents which exist because the transformer 11 is saturated because of a disturbance. Thus, these flux indication signals on line 39 and 41 are provided by voltage measurements $V_{AC}$ and $V_{BA}$ which are passed respectively through low pass filters 42 and 43 and then notch filters 44 and 45. As is apparent, the voltages are selected to correspond to the theta/lambda domains of the currents on lines 34 and 36. The low pass filters 42, 43 provide a washout function, meaning that on a long term basis their value goes to zero. Notch filters 44 and 45 are for the purpose of elimination of, for example, the 60 Hz or 50 Hz fundamental present in the transmission lines.

Next, the outputs of summing units 37, 38 are passed through integrating regulators 47, 48 which provide the angle output controls $a_{D\Theta}$ and $a_{D\lambda}$. Thereafter, these are processed in a reverse and rotate unit 49 which provides an inverse transformation back to the three phases, as indicated, and also provides rotation to minimize oscillation, as will be discussed below. The resulting three angle control signals (one for each phase) are coupled to the remaining control units, as indicated in FIG. 2, to provide the appropriate firing pulses to the thyristors of the thyristor controlled reactance unit 12, as illustrated in FIG. 1.

Figure 4:
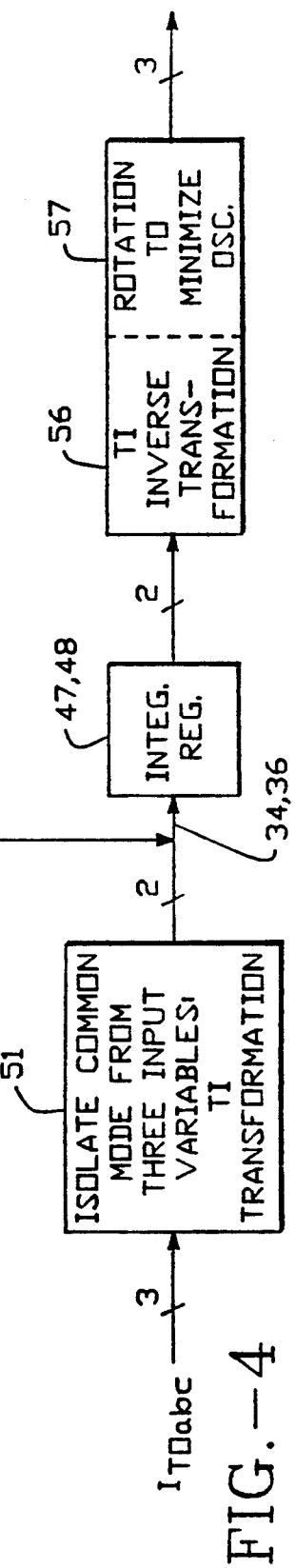
FIG. 4 is a higher level block diagram of FIG. 3.

FIG. 4 illustrates conceptually the processes of the control system of FIG. 3. Initially, the three DC offset currents from each phase of the delta of the TCR 12 illustrated in FIG. 1 are isolated from the common mode by undergoing what is termed in block 51 a T1 transformation of going from three input variables to two input variables. Thus, the so-called zero sequence is isolated. In other words, in the prior art of FIG. 2, all three control loops were responding to the common mode which causes an instability and this has been isolated out, as illustrated in FIGS. 3 and 4, by the specific T1 transformation technique. Thus, a zero sequence or common mode instability has been eliminated and the control loop will provide a control signal that comes to a steady state going to zero.

From a mathematical standpoint, the T1 transformation illustrated in FIG. 5A is a matrix function. And the theta/lambda domains are illustrated respectively as the phase differences a–c and b–a. And then the third row of the matrix provides a zeroing out of the total of the three phases.

Next, in accordance with the invention, the output of the T1 transformation unit 51 on the lines 34, 36 interacts with the signals representing flux change and the coming distortion due to the magnetic offset currents in the transformer. And the importance of this, as discussed above, is providing an advance indication of distortion since the change of flux is being measured directly rather than waiting for the consequences of that change of flux.

Next, as illustrated in FIG. 4, the standard integrating regulators 47, 48 are used to process the signal.

Finally, in order to provide the three control signals necessary to control the thyristor valves of the TCR 12 of FIG. 1, there must be a T1 inverse transformation. This is illustrated in FIG. 5B where the inverse of T1 is mathematically shown. However, in accordance with one of the objectives of the present invention, coupled to this inverse transformation is the need to minimize any oscillation in the feedback control loop over the full range of operation. This is accomplished by introducing a rotation of the phasors of the currents in the inverse transformation matrix. Thus, combined with the inverse transformation 56, as illustrated in FIG. 4, is also a rotation 57 to minimize oscillation. This has been termed the T2 function 49 in FIG. 3; it is shown in mathematical form in FIG. 5C as a rotation through an angle "x."

Thus, the first portion of FIG. 5C, as indicated at 56, is the first two columns of the T1 inverse transformation which is all that is necessary to reconvert from a two to a three variable system. Then the rotation is provided by the sine cosine matrix 57. Here "X" is the angle of rotation which determination will be discussed in detail below. But in any case, for a phasor rotation of the foregoing type, it is convenient that the three phase system be reduced to a two phase system. This is because any theoretical rotation must go through such a mathematical transformation. Thus, the provision of the theta/lambda domains provides an ideal context for the rotation to reduce oscillation.

The above oscillation is due to the nature of the external power systems and the control loop which is imposed on this system. The amount of oscillation potential over the full range of operation of that system can be reduced by introducing the rotation. In general, the angle of rotation is chosen to maximize the lowest damping ratio of this control over its operating range. Such a choice is made by doing several simulator studies of the overall system using varying operating points. FIG. 6 illustrates the results of one such simulator study where a control angle X of 30° was chosen, the system AC impedance was varied to three different values nominally indicated as $Z = 1.0, 2.0$ and $3.0$. And then the dashed curves show a graph of the damping ratio versus the operating range of the SVC. The object is of course to approach the damping ratio 1.0. Thus, the best "X" value is chosen to maximize the lowest damping ratio over the entire operating range of the particular system. Such choice from a mathematical standpoint involves choosing the proper Eigen values. And this is an Eigen value type solution since the functions regulating the present type of operating system will possess non-trivial solutions only for certain special values of the parameters of the system. And of course these solutions are called Eigen values.

Thus, in summary, the present invention has provided an improved control system for an SVC by the combined use of flux control, zero sequence or common mode response elimination and rotation of phasor.

What is claimed:

1. In a static volt-ampere reactive compensator where thyristor controlled reactances are utilized in a normally electrical configuration having three branches each having a current flowing therein, and where a feed back control system controls the firing angles o the thyristor switches to balance said branch currents, the improvement in the control system comprising:

means for measuring in each branch of said delta a direct current component of said current flowing in such branch; means for eliminating a common mode current which may circulate in said delta by transforming said three measured direct currents to a two-current variable system, and means for integrating the two currents of said variable system and inverse transforming them to provide three control signals for controlling said firing angles.

2. In an SVC, as in claim 1 where said means for eliminating said common mode current include means for differencing the direct current components of two different paris of said delta branch currents to form said two-current variable system.

3. In an SVC, as in claim 1 together with phasor rotation means for rotating the phasors of said delta branch currents to reduce oscillation in said delta by rotating said two-current variable system.

4. In an SVC having a nominal operating range, as in claim 3 where said SVC has a damping ratio characteristic determined by its operating parameters and where the angle of rotation of said two-current variable system is chosen for the lowest damping ratio of said SVC over the operating range.

5. In an SVC, as in claim 1 including means for sensing flux change and producing a two-variable signal for interacting with said two-current variable system.

6. In an SVC, as in claim 5 where said delta branch has a three phase voltage across it and where said flux change sensing means include means for filtering tow of said delta voltages corresponding to said two-current variables.

* * * * *